219-121 SR

8/8/78 OR 4,105,889

United States Patent [19] [11] 4,105,889

Kupsky [45] Aug. 8, 1978

[54] LASER METHOD OF INTRODUCING MERCURY TO GAS DISCHARGE DISPLAY PANELS

[75] Inventor: George A. Kupsky, State College, Pa.

[73] Assignee: Owens-Illinois, Inc., Toldeo, Ohio

[21] Appl. No.: 742,327

[22] Filed: Nov. 16, 1976

Related U.S. Application Data

[62] Division of Ser. No. 492,992, Jul. 30, 1974, Pat. No. 4,009,407.

[51] Int. Cl.[2] .............................................. B23K 26/00

[52] U.S. Cl. .............................. 219/121 LM; 206/525

[58] Field of Search ............................... 313/174, 177; 219/121 L, 121 LM, 121 EB, 121 EBM; 206/84, 532, 525

[56] References Cited

U.S. PATENT DOCUMENTS 3,895,709 7/1975 Przybylek ............................ 205/525

*Primary Examiner*—Robert T. Smith
*Attorney, Agent, or Firm*—Jim Zegeer

[57] ABSTRACT

There is disclosed an improved gaseous discharge display panel device and process of manufacturing same. A large number of cathode substrate electrode and mask structures are printed and fired on a single glass sheet, the electrodes being printed first and dried/cured at a higher temperature than subsequently applied mask and electrical crossovers, which are cured at lower temperatures. Upon completion of fabrication of the electrode and dielectric mask structures and crossover connections, the glass plate is simply scored and separated to provide individual back substrate and electrode mask structures which are then assembled with a like formed annode plate structure. Individual devices are then assembled with use of a seal rod preformed to have a gap in the seal structure and a laser facturable mercury dispensing giver. In forming the devices, the gas is processed through the small gap left in the seal structure and, the gap is closed with a short sealing rod through and about which outgasing and gas filling are formed during the final gasing step. Batch processing of devices in the range of 1000 - 5000 in a relatively short period of time.

2 Claims, 9 Drawing Figures

PROCESS FLOW CHART
(NUMBERS REFER TO PROCESS STEPS)

LASER METHOD OF INTRODUCING MERCURY TO GAS DISCHARGE DISPLAY PANELS

This application is a division of my Application Ser. No. 492,992, filed July 30, 1974 entitled "Segmented Gas Discharge Display Panel Device and Method of Manufacturing Same", now U.S. Pat. No. 4,009,407.

BACKGROUND OF THE INVENTION

Fabrication of gas discharge display devices generally of the character disclosed herein have been accomplished in the past and typically these are one-for-one type operations. That is, individual glass substrates and/or ceramic substrates are provided upon which the conductor runs are printed and then the dielectric masks are printed over the conductor runs and in the openings in the conductor runs for the cathode electrodes, the cathode materials which interface with the gas discharge medium are printed thereon and all of these being subsequently fired and cured. Such devices are subsequently assembled usually by the use of a gas filling tubulation but in some cases tubulationless devices have been fabricated in which final hermetic seal of two spaced apart substrates accomplished by utilization of an unfused sealing frame, evacuating the entire unit and back filling with an elevated temperature and then heating the assembled parts spaced between the electrode elements while retaining the gas in the assembly until the glass parts have been softened to a sealing temperature to result in a fusion sealing of the frame element and thereby final assembly of the device. This process is difficult and cumbersome and does not lend itself well to batch processing of individual display elements.

In Boswau U.S. Pat. No. 2,142,106, a gaseous discharge display device having small glass discs carrying shaped cathode elements and individual annode elements are stacked in a disc with the interstices between the discs sealed in a manner around the periphery to prevent electrode interference between each other, a small aperture being left at one point in the periphery by leaving out the sealing operation at this point to provide communication with the main gas chamber formed by an overall glass envelope or bulb. In the Boswau patent, the bulb is subsequently exhausted and filled with the gas at a proper pressure, the exhausting and back filling processes extending through and communicating through the aperture to the individual gas chambers formed in the spaced disc and the aperture then is filled with a suitable sealing material which permits the gas to permeate during the exhausting and filling operation thereafter this individual seal element or plug is sealed by heating means of electronic bombardment or other sealing means. The present invention is a direct and distinct improvement over the sealing technique disclosed in the Boswau patent in that the present invention adapts a portion of that technique of the Boswau patent and extends same to batch processing of thousands of individual discrete gaseous discharge panel elements in a manner and fashion not heretofore available, with yield factors significantly greater than those of the prior art. A substantially bubble-free glass rod, shaped generally in the perimetrical configuration of the gas chamber is fused to the two substrate surfaces in an air atmosphere. A small opening or space between the ends of the rod is provided. Large numbers of the device may be stacked in trays, with a small glass rod bridging the ends of the rod and space and held in position by the opposing substrate. The rod seal or plug is slightly smaller in diameter to snugly fit between opposing substrate surfaces and has a fusion temperature slightly below that of the formed rod. Both materials are, however, of optical quality and of substantially bubble-free edge surfaces. This loose rod seal element or plug permits batch vacuumization (also under bake out conditions if desired) and back filling with any desired gas composition of large numbers of individual devices in a single operation.

In the prior art, in making segmented electrode gaseous discharge display panels, particularly alphanumeric type displays, the individual conductor runs are printed first and fired on the substrate and subsequently, the mask and cathode element electrodes e.g., those elements which are to be in direct conductive contact with the gas are printed and cured, the printing of the cachode elements being through the apertures or openings in the dielectric mask. In accordance with this invention, instead of using a ceramic substrate, simple, inexpensive glass substrates are used. The conductor elements forming the cathode electrodes which interface with the gas medium are printed first and cured at relatively higher temperatures so as to assure that those conductor segments or elements forming the cathodes of the device have a good hard surface at the gas interface so as to minimize sputtering problems and improve the discharge properties of such devices.

In the sealing operation described earlier herein, it has also been found that the use of screened on sealing materials in an unfused state, is not as desirable as the use of a preformed rod element fabricated from glasses having fiber optic properties, that is to say no bubbles therein which distort and rupture the seal upon heating and/or vacuumization.

The typical and classical way of fabricating gaseous discharge devices is to vacuum bake the devices so as to remove included gaseous contaminants from the interior surfaces of the device. Vacuum baking is a very time consuming and expensive process. In another feature of the process of this invention, the several thousand devices stacked in trays are placed in a vacuum chamber. The vacuum is pulled over the device without heating to remove substantially all of the free contaminants from the individual gaseous discharge devices and then, at an ambient temperature, the gas filling is admitted to the processing chamber and thereby each individual gaseous discharge element is filled as room or ambient temperature. This assures proper gas proportions and eliminates the need for accurate and precise calibration at high temperatures of the gas filling. Then, after the gas filling has been introduced to the devices, the devices are heated by Calarod heaters inside the chamber so as to effect a melting of small sealing elements in the openings described earlier herein. This technique thereby avoids the long time between the filling and heating of the chamber thereby reducing a production run of thousands of devices in a single chamber to no more than six hours in pumped in heating back filling with the gas and the like. Since this sealing processs is done at a pressure somewhat below ambient, and since the volume of gas in the vacuum chamber can be greater than the cumulative gas volume contained in the devices, there is sufficient heating under somewhat negative pressure conditions to assure good clean up of the device under less than perfect vacuum conditions and at significantly reduced cost and processing time. In still another feature of the invention, small mercury-containing capsules or givers are activated by the use of a laser beam. To this end, the device is provided with laser transparent windows in each of two glass substrates which thereby permits the use of a laser beam to effectively break the mercury capsule without damaging the device itself.

Finally, in the prior art, connections between the anode electrodes and exterior connections to operating potentials have been by means of small metal clips between the two substrates. In accordance with this invention a conductive epoxy is inserted between the terminals ends of the annode electrodes and the printed conductor ends on the cathode plate. According to the invention, this epoxy is carefully cured so as to assure that there are no bubbles in contact with the annode elements which would tend to cause hot spots and breaking of the anode connections.

DESCRIPTION OF THE DRAWINGS

The above and other objects, advantages and features of the invention will become more apparent from the following description taken in conjunction with the accompanying drawings wherein.

DETAILED DESCRIPTION

Figure 1:
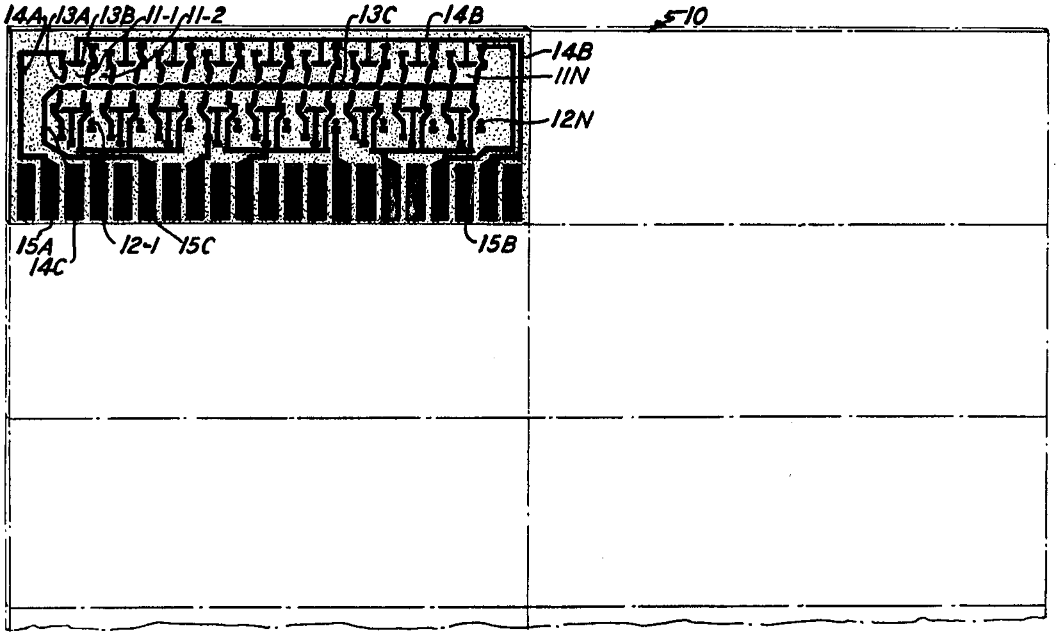
FIG. 1 illustrates a glass substrate upon which a first conductive pattern has been printed, one such pattern being shown in the top left hand corner thereof with the dash lines indicating the positions of a large number of other such patterns not shown in this drawing for purposes of clarity of explanation.
Figure 8:
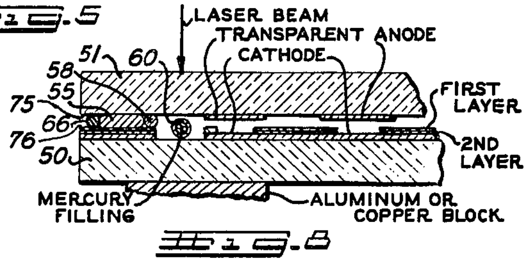
FIG. 8 shows the mercury capsule in position with a laser beam directed thereto for fracturing same.
Figure 9:
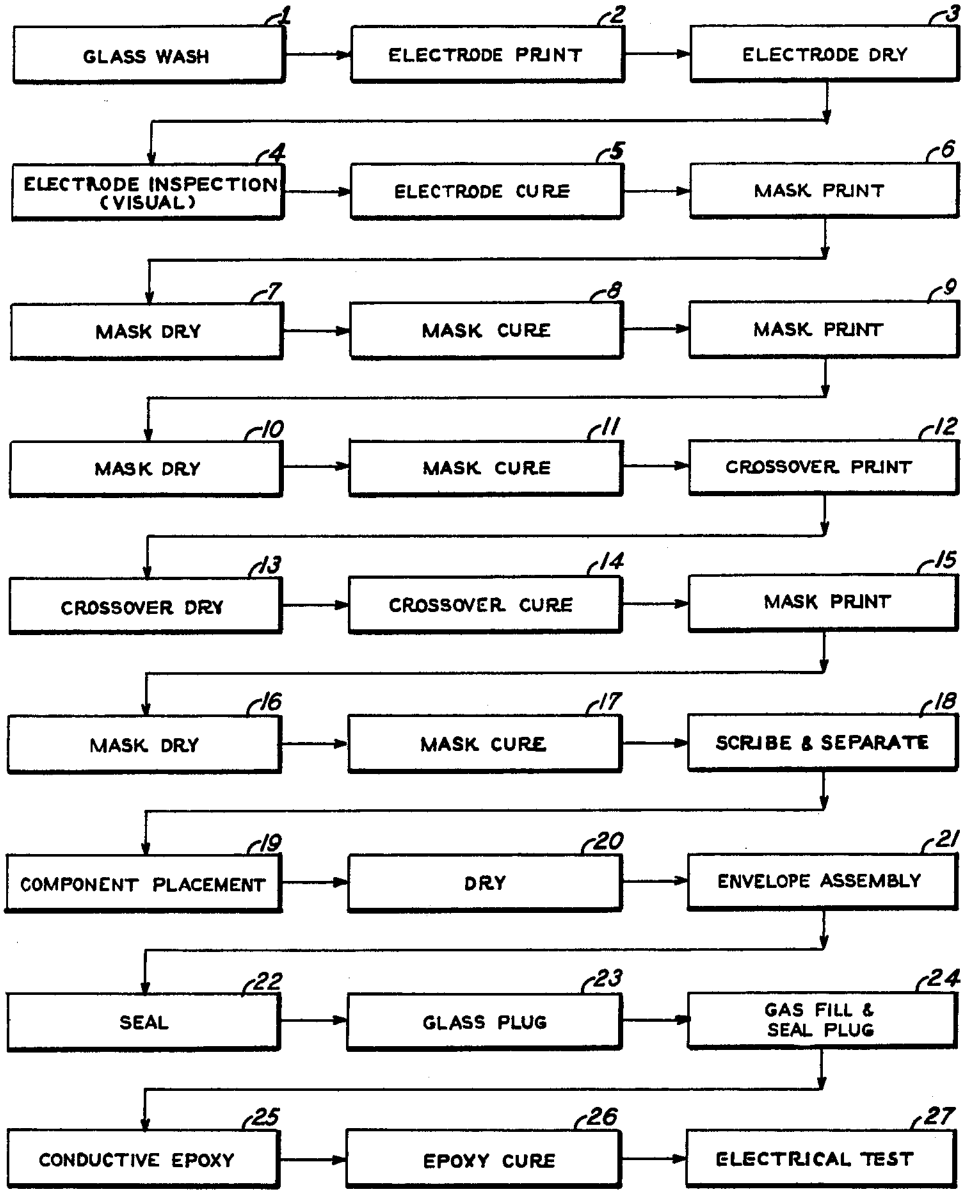
FIG. 9 is a process flows chart showing the individual printing and curing operations utilized in the manufacture of the devices.

Referring now to FIGS. 1–8 in conjunction with FIG. 9, FIG. 1 shows a glass plate 10 which, in a specific example, may be ten inches by twelve inches single strength glass, has printed thereon individual cathode electrode patterns 11-1, 11-2, 11-N and cathode period elements 12-1, 12-N. Each cathode pattern constitutes a digit position, the illustrated embodiment being for a nine digit numeric display (*n*-9). It will be appreciated that the invention is equally applicable to alphanumeric segmentation as well as crosspoint matrix display. These elements have cathode electrode segments 13A, 13B etc. which, in the embodiment of this invention, constitute the cathode electrode elements defining the glow discharge portions of the display. It will be noted that certain ones of these cathode segments 13A, for example, has a further direct conductive portion 14-A leading to a conductor pad 15-A. In the embodiment of this invention to be described herein, each of the corresponding segments 13-A in all of the digit positions 11-1, 11-2 . . . 11-N, are interconnected electrically, some of which are directly interconnected in the initial electrode printing shown in FIG. 1. For example, the center bar segment 13-C is shown as being an interconnected horizontal segment electrode and by conductor portion 14-C to a pad 15-C. Alternate pads are also printed at this time for subsequent connection to the anode elements to be described later herein. In like manner, the cathode electrode 13-B in digit position 11-1 is interconnected to every cathode segment designated with the numeral B by a conductor portion 14-B and thereby to a pad 15-B.

Figure 2:
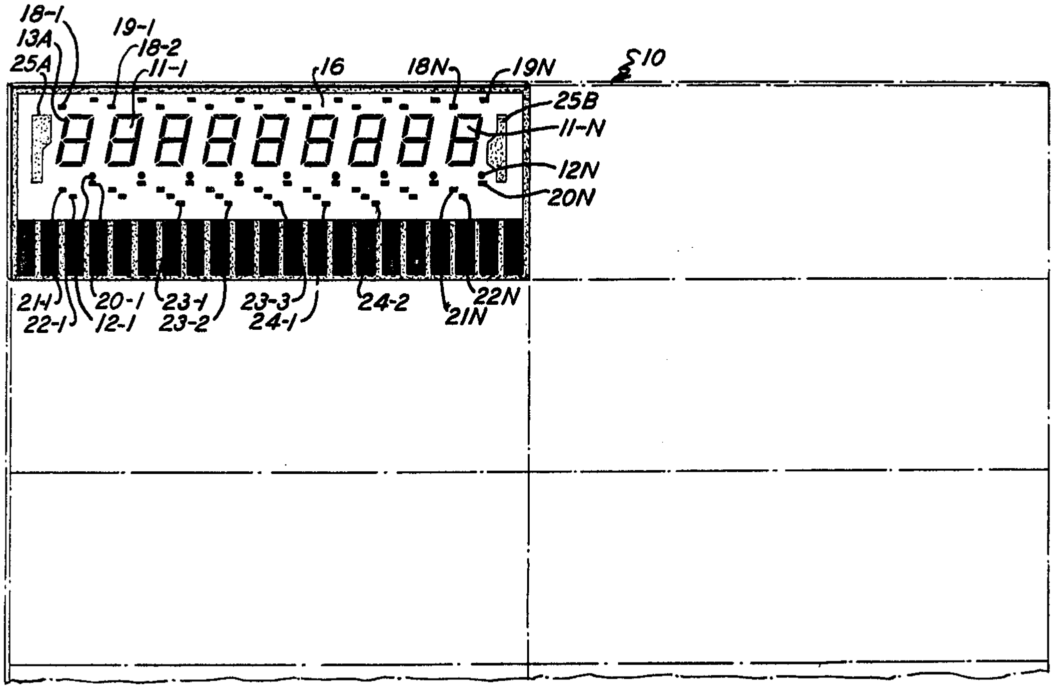
FIG. 2 illustrates the glass plate of FIG. 1 upon which has been printed the first dielectric mask (a black colored dielectric but shown white in FIG. 2.

However, in accordance with the present embodiment, some of the cathode segments are not directly connected to conductors extending to the individual pad elements 15. In the illustrated embodiment, a first dielectric mask element 16 shown in FIG. 2 is printed over the condudtor segments leaving openings or vias 18-1, 18-2, 18-N and 19-1, 19-2, 19-N and 20-1, 20-N, 21-1, 21-N and 22-1, through 22-N, all of which are in registry with an underlying conductor portions or areas. These vias are simply opening or spaces left vacant in the dielectric mask or layer 16. In addition to the vias or openings left for crossover connections, to be described later in connection with FIG. 3, it will be noted that the individual cathode segments 13-A, 13-B, etc. and the periods therefor 12-1 . . . 12-N, are left open. As has been described earlier, no further conductive material is applied to these cathode elements because they have been cured at a higher temperature to thereby anneal and/or provide smooth surfaces for the discharge per se. However, the crossover vias, 18-1 . . . 18-N, 19-1 . . . 19-N, 20-1 . . . 20-N and 22-1 . . . 22-N are left open for the purpose of permitting the conductor material which is printed in a manner shown in FIG. 4 to make electrical contact with the conductor elements exposed by the vias. These form the electrical crossover connections shown in the pattern of FIG. 3. It will be appreciated that conductor patterns may be devised so that the printing of such crossovers is eliminated or minimized. It should be understood that while the dielectric mask is shown as white, it is a black mask for highlighting the glow discharges at the cathode segments, and that the cathode material is white or silver colored in appearance and, in fact, is basically a silver in a suitable vehicle. Furthermore, clear or transparent areas of glass have been stippled. Of course the anode glass substrate could be translucent.

In addition to the openings or vias to make the crossover connections and in addition to the opening for permitting the cathode segments to be viewed in direct conductive contact with the gas, a pair of windows 25A and 25B are provided so that the glass substrate 10 is directly viewable through these openings 24 and 25. These openings are for the purpose to be described more fully hereinafter.

Not shown in FIGS. 1 or 2 are conventional registration marks, the registration marks simply being marks which are printed in dielectric material upon the substrate 10 and in any subsequent printing upon the substrate 10 when the dielectric material is printed so as to assure registration thereof. In like manner, in the following pace which also follows, further printings of the registration marks are made to assure the proper registrations are achieved. The term printing is used principally to encompass stencil screen printing etc., but other forms of printing may be used.

Figure 3:
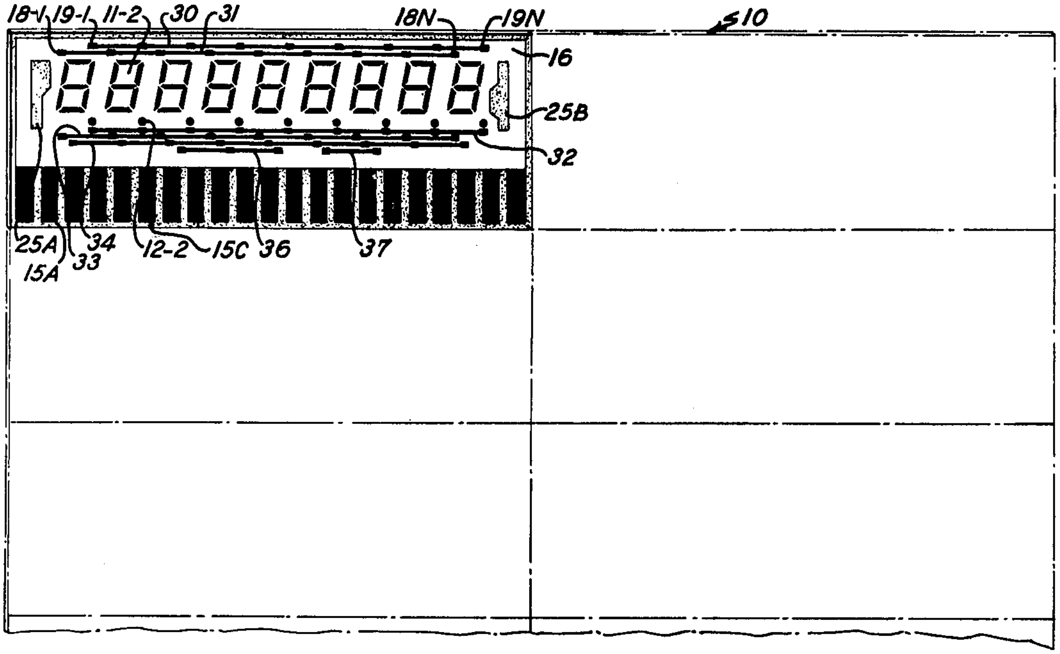
FIG. 3 is the plate shown in FIG. 2 having the crossover conductors printed on the mask of FIG. 3 interconnecting the different elements shown, it being understood that a similar printing has occurred with respect to the other substrate elements shown in FIG. 3, In FIG. 4, a further dielectric printing has been accomplished over the crossover elements shown in FIG. 3.

As shown in FIG. 3 the crossover interconnecting via 19-1 through via 19-N is designated with the numeral 30 and the crossovers connecting the vias 18-1 . . . 18-N are designated 31. In like manner, crossover conductor means 32, 33 and 34 are conductor printings upon the dielectric. The printing operations are simply screening or othewise applying the conductive material directly upon the dielectric surfaces of the substrate with the conductive material entering the vias and making the electrical contacts with the conductor previously printed. It will also be noted that a pair of crossovers 36 and 37 have also been printed upon the conductor solely for the purpose of making the crossover connections between the conductor elements as shown.

It will be noted that the conductive cathode segments for each of the digit positions remains exposed and these elements are, in effect, continuing to receive the temperature treatments (albeit at lower temperatures) for the curing of the dielectric layer 16 and the individual crossover layers as shown.

In a final printing operation, the final dielectric layer is applied over the crossover, the windows 25A and 25B being maintained. The purpose of this final printing is, as is well known, to avoid any glowing of conductor areas or portions which is it is not desired to glow.

Referring now to FIG. 9, it should be noted that an important step in the process just described in the fabrication of the back substrate is that the electrodes which form the cathode segments for the display have been printed in an initial printing operation. This electrode is cured in step 5 as shown in FIG. 9 at a much higher temperature than could be effected by prior art techniques in fabrication devices of the character of the present invention. In other words, by printing the cathode segments first and curing them at a much higher temperature to provide cathode-gas interface, the mask which is printed on at a later time, can be cured at lower temperatures without adversely affecting the conducting properties of the different conductor elements used in providing exterior connections for the device. As shown in FIG. 9, the initial mask is printed in a two step operation of, first, printing the mask a first time, drying the mask and then curing the mask. A second mask printing, drying and curing operation is effected but it will be appreciated that these may be done in a single step. In some cases, the mask may be fabricated as a film and transferred to the substrate. However, it is important to assure that the mask is of a sufficient thickness that the gap adjacent cathode segments is separated by a physical barrier of dielectric material. Thus, this second step is an important assurance that the dielectric between the ends of individual cathode segments is high enough to provide a barrier which avoids or minimizes shorting between nearby cathode segments.

The crossover printing is done with the same conductive material as is used in the first printing operation of conductive material and it will be noted that in each case, the conductive material is dryed and then cured at higher temperatures. This material is a frit based thick film paste primarily of silver. The third mask printing operation, while it could have been limited to printing simply over the crossovers, was, in effect, a full printing since this further assured a sufficient barrier between the individual cathode segments on the substrate. Thus, in addition to being able to print, dry and cure the cathode electrodes at a high enough temperature (a typical conveyor oven being about 50 ft. long, one foot per minute, there being about 15 heat zones with a maximum temperature of 1100° C.) as to assure a good, clean, smooth silver surface for the cathode electrode, printing the cathode electrodes in a first printing step permits the building up in the mask areas of sufficient barriers between the individual cathode segements as to reduce the possibility of conductive connections between the individual cathode elements due to the sputtering, etc. and thereby enhance the active life of the device.

Figure 4:
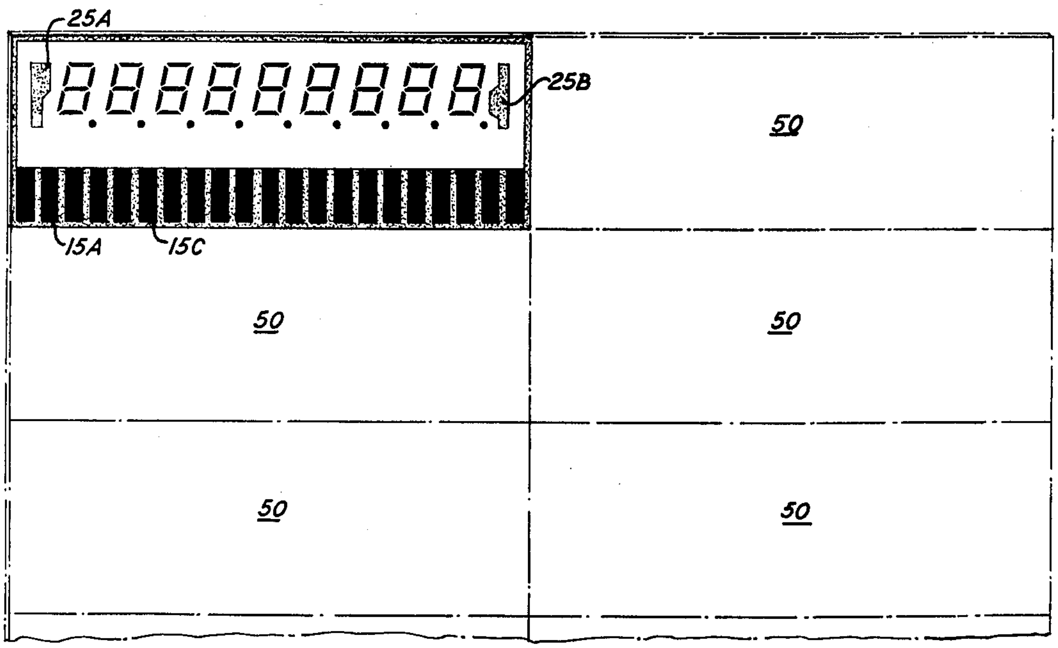
Figure 5:
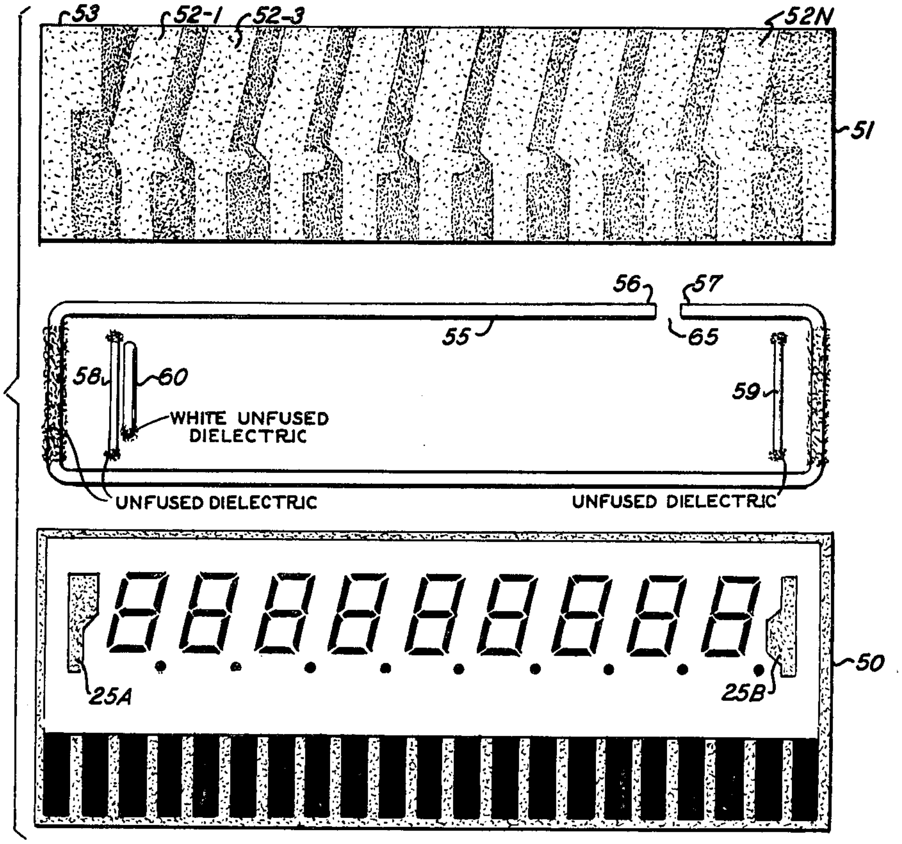
FIG. 5 is an exploded view showing the sequence of assembly of the different components into a device ready for batch fill and seal operations.
Figure 7:
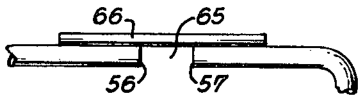
FIG. 7 is an enlarged sectional view showing the placement of the seal rod bridging the gap on the now fused seal frame.

As illustrated at box 18 of FIG. 9, the device is scribed along the dash-dot lines and separated to provide individual back substrates illustrated in FIG. 5 as element 50. Element 50 is identical to the different element 50 shown in FIG. 4.

Referring now to FIG. 5, the back substrate now designated as element 50, is identical to the back substrate component shown in FIG. 4. Also shown in FIG. 5 is an anode substrate 51 having printed thereon individual anode elements 52-1, 52-2, 52-N, there being one such anode electrode element for each digit position and adapted to overlie the individual cathode segments and the cathode period element 12-1 at a given digit position. The anode conductors are transparent tin oxide which are printed and fired on a single strength glass substrate 53. It will be appreciated that the printing and firing of these conductors may be done in a batch process, very much like the printing of the back substrate with cathode elements. The use of tin oxide as a transparent anode element is conventional in the art and is not described in detail herein except to say that the process of printing same with large numbers of devices on a thin glass substrate is useful for the purpose of batch producing devices.

The top substrate or anode plate 51 is joined to the bottom substrate by means of a sealing element or member 55 which has been shaped so as to have the ends thereof 56 and 57 spaced by about a ¼ inch to about 1/16 inch. The sealing element 55 is simply placed upon the black dielectric masked element and held in place by drying unfused dielectric. At the same time, small spacer rods 58 and 59 at each end of the device are likewise temporarily held in position by tacking as by the use of unfused dielectric. Spacer rods 58 and 59 consist of a hard glass composition having a higher softening temperature than the sealing element 55. The seal element 55 is made from a fiber optic type glass which has no bubbles therein and which has a fusing or seal temperature below the melting point of the glass substrate 10 and spacer rods 58 and 59 (a seal temperature of about 450° C. is used). In addition, a small mercury capsule 60 is held in place in position over window 25A by a white unfused dielectric which is of essentially the same composition as the dielectric forming the mask but which does not have any pigmentation in it. The purpose of using a white unfused dielectric is so that a laser energy which is used to rupture the capsule 60 is not absorbed by the black dielectric to create heat in the black dielectric and thereby destroy the device. It is also for this reason that a pair of windows 25A and 25B is provided.

Figure 6:
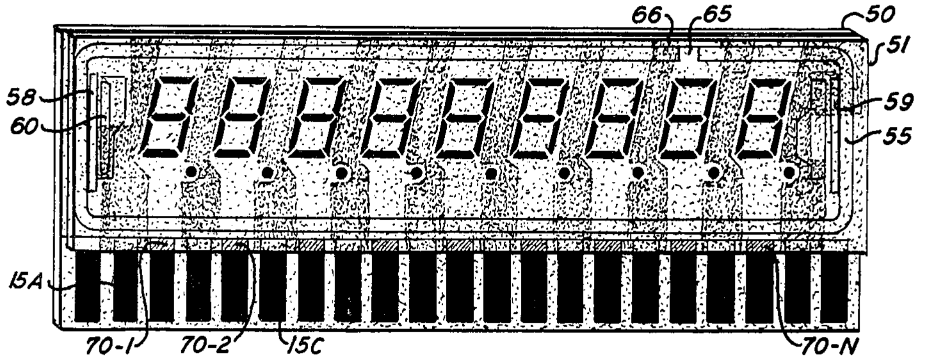
FIG. 6 is a top plan view of a completly assembled device.

After the sealing member 55 and spacer rods 58 and 59 and mercury capsule 60 have been positioned in the device, the anode plate 51 is positioned over these elements and a weight is applied thereto. The entire assembly is passed through a heating oven to fuse or join the sealing member 55 to anode plate 51 and back substrate plate 50. The resulting device is illustrated in FIG. 6 and it will be noted that there is a small gap 65 so the interior of the gas chamber is accessible. A glass rod 66 having a diameter about the same diameter as spacer rods 58 and 59 is simply laid in the gap or crevice between back substrate plate 50 and anode plate 51 and constitutes the glass plug illustrated in block 23 of FIG. 9.

It will be appreciated that the spacer rod elements 58 and 59 need not be lcoated in the gas chamber formed or in the positions shown. They may be located parallel to the horizontal runs of seal 55, parallel to all four runs, between display positions for larger displays (see Baker et al U.S. Pat. No. 3,499,167); even externally of the chamber and parallel to the horizontal and/or vertical runs of seal member 55. As a matter of fact, the spacer may have a perimetrical pattern which is a twin to seal member 55, and only slightly larger or smaller. The only size criteria of the spacer is that it define the discharge gap and be a high melting temperature glass and have a fiber softening point below that of seal member 55.

As shown in FIG. 6 alternate ones of contact pads 15 are connected to the cathode electrode on cathode plate 50 and the intervening ones are connected by means of a extruded conductive silver expoxy connectors 70-1, 70-2 as an improvement over prior art metal insert connectors previously used for this purpose. It is important to cure the epoxy at a temperature such that bubbles are not formed. Bubbles tend to cause concentrations of current flow in the tin oxized coatings and thereby impair or destroy the connection thereto.

As shown in FIG. 8, the mercury giver 60 is a filamentary glass tube (18 mils in outside diameter) which is laser energy transparent. It is positioned between a window 25A and the cathode plate 50 and a transparent portion of the anode plate 51 (which may also be designated as a "window") and held in place for assembly purposes by a white dielectric. The aluminum or copper block serves as a heat sink and should not be highly reflective for safety reasons. The laser energy is at a wavelegnth of about 1 micron. Instead of a glass capsule the giver may be any other radient energy actuatable device, such as SAES type 150 giver from the SAES company of Italy.

The gas filling may be a mixture of neon and argon, such as 99.5% neon and 0.5% argon. As is conventional, radioactive Krypton (Krypton 85) may be added to the fill mixture to lower the operating voltage. However, it will be noted that there are two unused contact pads 15 which could be used to operate a keep alive discharge as is also conventional in the art.

In a preferred embodiment, the edges 75 and 76 on plates 50 and 51 from a slot or notch for receipt of the seal rod or plug member 60. This permits a simple mechanical retention of the spacer in its desired position during the outgassing and gas filling operation. If desired the top horizontal run of seal member 55 may be located closer to the edge so that upon softening the seal material of element 55 will be pressed flat as shown in FIG. 8 and the plug rod 66 held in position by an adhesive such as unfused dielectric. However, the seal member 55 may be formed flat in cross section and, as before, slightly thicker than the spacer rods. The panel assemblies, with seal rod 66 in the notch or space and bridging the ends of the seal element 55, the panels are stacked, in stainless trays with the port or space 65 up and the glass rod 66 in place. A high temperature glass shim, not shown, is located between the lower edge of anode plate 51 to maintain the proper relationship between the anode and cathode plates while the heating of seal rod 66 is performed.

Seal element 55 is a bubble-free glass to avoid "worm" holes therein, a fiber optic type glass such as Corning type 7570 glass 033" O.D. cane formed as shown in FIG. 5 works satisfactorily, it having a relatively low temperature of about 450° C. The glass plugging element or rod 66, placed across the opening or port 65 as shown, has fiber softening point below that of the sealing member 55; a similar glass with a fiber softening point 20° to 30° lower is satisfactory.

The gas process procedure is the evacuation of the system, the introduction of the proper gas at ambient room temperature to the proper pressure, about 120 torr, and the heating of the seal rod so it closes the envelope with the desired gas condition. In the system described above, the cycle is 6 hours with 2000 devices per cycle. Each chamber can be large enough to handle as many as 5000 devices. The cycle may be reduced to 1½ hours. If devices fail to seal, they are simply recycled. System gas is recovered by operating two chambers in parallel. After the sealed devices are removed from the gas process system, each one is placed under a laser which is projected through a window in the device to crack the capsule and release mercury into the envelope. As is conventional in the art some panel aging time may be performed before releasing the mercury.

It will be appreciated that while a number of modifications have been referred to, others will become apparent to those skilled in the art and it is to be understood that such obvious modifications may be made without departing from the true spirit and scope of the claims appended hereto.

What is claimed is:

1. A process of introducing mercury in a flat, tubulationless, gas discharge display panel device having a pair of spaced opposed laser transparent windows in glass plates forming said device, said windows being outside the information display area of said discharge device, a laser activatable mercury giver located in the discharge gas medium in the space between said laser transparent windows, comprising placing a thermally conductive, not highly reflective metal block on the exterior surface of one of said windows, directing a beam of laser energy through the other of said windows onto said laser activatable giver to cause elemental mercury to be released within the gas medium in said device.

2. The invention defined in claim 1 wherein said thermally conductive metal block is aluminum and said laser energy is at a wavelength of about one micron.

* * * * *